United States Patent [19]

Söderholm

[11] Patent Number: 4,939,938
[45] Date of Patent: Jul. 10, 1990

[54] LOAD TRANSMITTING DEVICE FOR ELECTROMECHANICAL MEASUREMENT TRANSDUCERS

[75] Inventor: Arne Söderholm, Bromma, Sweden
[73] Assignee: S.E.G. Resistor AB, Vallingby, Sweden
[21] Appl. No.: 304,260
[22] Filed: Jan. 31, 1989
[30] Foreign Application Priority Data
  Feb. 2, 1988 [SE] Sweden ................ 8800313-2
[51] Int. Cl.$^5$ .............................. G01L 1/26
[52] U.S. Cl. .................. 73/862.38; 73/862.65
[58] Field of Search .......... 73/862.38, 862.62, 862.65, 73/862.66; 177/211, 255, DIG. 9; 338/5

[56] References Cited
U.S. PATENT DOCUMENTS
3,284,749 11/1966 Fouretier .............. 73/862.65 X
3,621,927 11/1971 Ormond ............... 73/862.65 X Primary Examiner—Charles A. Ruehl

[57] ABSTRACT

An apparatus for electromechanical measurement of forces for weighing is provided. There is a mechanism for measuring the load, which has two parallel end planes. In contact with each end plane is a respective load transmitting unit having two curved surface portions one on each side of a plane parallel to the end planes. The transmitting units both have a longitudinal axis parallel to the end planes and perpendicular to each other. All points on each curved surface portion are the same distance R away from an axis parallel to the end planes, R being greater than half the height of the transmitting unit in a direction perpendicular to its longitudinal axis. Movement of the measuring mechanism is restricted in a direction parallel to its longitudinal axis which is perpendicular to the end planes. One curved portion of each transmitting unit contacts an end plane of the measuring mechanism, and the other curved portion of each transmitting unit contacts the opposing end plane. The other curved surface portion of each transmitting unit is connected to a respective foundation plate; one plate receives the load; and the other plate can be connected to a support. A guiding mechanism is provided to prevent relative movement between the transmitting units and at the end planes, and between the transmitting units and the foundation plates, in any direction parallel to the parallel planes. The two transmitting units operate to transmit forces relating to the load to the measuring mechanism.

18 Claims, 2 Drawing Sheets

LOAD TRANSMITTING DEVICE FOR ELECTROMECHANICAL MEASUREMENT TRANSDUCERS

BACKGROUND AND FIELD OF THE INVENTION

This invention relates to transmission of a load from a load carrier (container, bridge) to a load measuring transducer and further to a foundation, without the influence of disturbing loads. Load measuring transducers are load measuring sensing means in electromechanical scales, i.e., scales in which an electrical signal is used which corresponds to the measure of the load.

When using load measuring transducers to measure a load, the influence of disturbing loads is a central problem. The problem exists because the load carrier is affected by the disturbance as the the load causes deformation of the carrier. The deformation is reflected in changes both in the length and the angles of the carrier. Dimensional changes can also be caused by other influences such as variations in temperature. Those transversal movements and angular changes create additional forces and movements which act on points of support including those on the load measuring transducers. To eliminate disturbing influences, attempts have been made either to make the load measuring transducers stiff so that they can transmit the disturbing forces and movements, or resilient; in either case, the arrangement is made such that no erroneous measuring indication of the load would arise. Because disturbing loads can substantially exceed the size of the measuring load, those solutions can lead to constructions which are uneconomical at great loads or which are unreliable.

A number of methods according to the above-mentioned solutions are known. Resilient transmissions are advantageous in that they are self-stabilizing, i.e., that they tend to enter a starting position. In that manner, no strut is needed to hold the load carrier in a distinct position.

Examples of such constructions are described in Swedish Patent No. 386 268 wherein the load measuring transducer is provided with spherical end surfaces having a radius greater than half the height of the load measuring transducer; that arrangement gives rise to a self-stabilizing effect. Moreover, that device is embodied so that the transversal movements and angular movements are limited by mechanical stops. Other examples of resilient constructions are described in Swedish Patents 366 116 and 451 891. Those constructions are provided with cylindrical oscillating pieces placed above the load measuring transducer and have spherical end surfaces; they avoid errors which arise in the load measuring transducers due to their angular changes from the vertical axis upon transversal movements of the load carrier.

However, with spherical surfaces, great mechanical stress concentrations appear on the contact surfaces. If the radii of the spherical surfaces are increased to reduce stress concentrations, the working point of the contact surface of the load measuring means is moved in proportion to the angular change of the oscillating piece or load measuring transducer; errors which certainly arise (according to one patent) can be used to compensate for weaknesses of the load measuring transducer. Therefore, the size of stress concentrations cause restrictions in the size of the resetting force relative to the measuring load. Those restrictions bring demands on precision when arranging the load carrier on load measuring transducers, and on work adjustments to ensure that the oscillating means have a stable vertical starting position.

SUMMARY AND OBJECTS OF THE INVENTION

It is an object of the invention to provide a self-stabilizing load transmitting device which can provide a great degree of stabilizing effect, which is subject to moderate stress concentrations in the contact surfaces, and which does not permit transversal movements to give rise to angular changes in the load measuring transducers and erros associated therewith. Moreover, the device can also transmit tractive loads, such as those due to wind forces on containers placed outdoors. Those properties make the device universal in use; the finished unit —transmitting device together with the load measuring transducers —can be easily mounted below a load carrier.

The load transmitting device of the present invention has a load measuring body with parallel end planes. The deformation of the load measuring body which is the measure of the load to which it is exposed can also be measured in an inductive or resistive way, and its embodiment between the end planes is designed according to the measuring principle used.

A load transmitting body is in contact with each end plane. They are formed with the same geometry; one transmitting body permits transversal movements and angular changes in one horizontal direction at one end of the measuring body, while the other transmitting body is plane in that direction. The other transmitting body is turned perpendicularly to the first transmitting body in the horizontal plane and, in turn, permits movements and angular changes in a direction perpendicular to that permitted by the first transmitting body. In that manner, the measuring body will retain its vertical position. The measuring body is attacked by an extended load transversely across its end planes; thus, the specific expression on the contact surfaces will be considerably lower than the case in which the load attacks on points of contact. Therefore, the radii of the transmitting units can be selected so that a corresponding greater self-resetting force will arise.

According to another aspect of the invention, in order to fix the position of the transmitting units, the contact surfaces are provided with holes for pins or balls capable of transmitting the size of the arising resetting lateral force. Moreover, it is suitable to supplement the device with foundation plates; those can be provided with distance screws and washers with holes adapted to grooves in the end sections of the measuring body so that the two foundation plates are connected via the load measuring body. In that way, the device can also transmit a tractive force.

The device is cheap to manufacture if numerically controlled machines are available which can provide simply curved surfaces such as arcs without much manual handling (filing between milled coordinate steps).

DETAILED DESCRIPTION OF PREFERRED EMBODIMENTS

Figure 1:
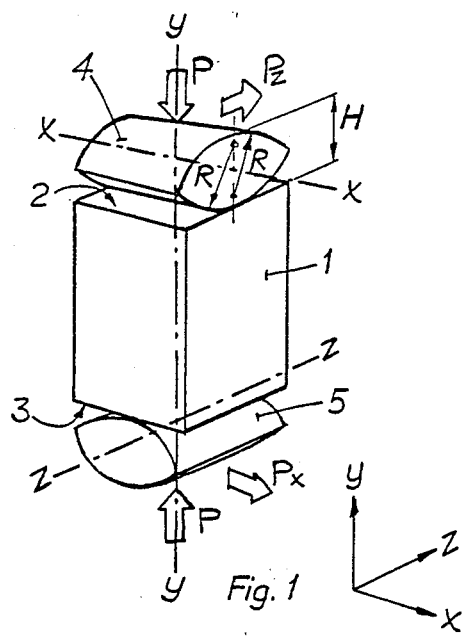
FIG. 1 illustrates one embodiment of the present invention.

FIG. 1 shows the essential design of the device according to the present invention. Measuring body 1 is shown here with a rectangular cross-section; it has parallel end planes 2 and 3 and a longitudinal axis along the Y axis in a coordinate system defined by the X, the Y, and the Z axes. Transmitting units in the form of oscillating pieces 4 and 5 rest against the end planes as shown; the load P and its counter force attack via plane surfaces (not shown) on the opposing side of said oscillating pieces 4 and 5.

The oscillating pieces consist of lying cylinders the surfaces of which have a simply curved spherical form with the radii R. The radii are greater than half the height H; thus the oscillating pieces will enter a stable position against a support plane.

If the plane at which the load P attacks is moved in the direction Z, the radial surfaces of the oscillating piece will cause it to roll and turn around the X-axis. At this slanted position the distance between the planes will increase to beyond the distance H; that increase in height corresponds to a work giving a horizontal lateral force Pz in a direction tending to turn the oscillating piece back to its original position. In circular cylinders, the corresponding force will be zero. The lateral force Pz also tends to turn the load measuring body around the X-axis. The oscillating piece 5 placed at the other end of the load measuring body, however, has its longitudinal axis turned at right angles to the longitudinal axis of the oscillating piece 4, i.e., along the Z axis in the system of coordinates. The transversal circular cylinder surface is in contact along its length with the lower end plane of the measuring body and absorbs the moment from the force Pz; thus, no turning of the measuring body around the X-axis will arise.

If the lower plane at which the counter force P attacks is displaced in the X direction, the oscillating piece 5 will, instead, be turned around the Z-axis; a corresponding resetting force Px will arise and the moment tending to turn the load measuring body around the Z-axis is taken up by the transversal upper oscillating piece 4. If the attacking planes via which the force P attacks are not parallel, the oscillating pieces will yield for the angular changes in a corresponding way.

The contact surface, over which the load is introduced into the load measuring body, has the form of a line across the end plane of the measuring body; therefore, the specific surface pressure will be lower than that in embodiments in which the attacking surfaces have a spherical form. That yields a possibility for dimensioning the oscillating pieces so that a considerably greater resetting force is achieved than in the case of spherical surfaces. The resulting advantage is that position tolerances in the mounting of the measuring transducers below the load carrier become less critical, and that horizontal disturbing forces will not displace the load carrier in a high degree. Accordingly, the natural oscillation frequency after transient forces will be higher and are damped out faster.

As horizontal forces (Pz and Px) can be relatively high, the neutral position of the oscillating pieces, that which corresponds to a condition in which there is no horizontal movement or angular changes of the attacking planes, can be fixed such that a rolling friction upon oscillation would not cause sliding motion over the surface planes. How that is accomplished is illustrated in FIG. 2.

Figure 2:
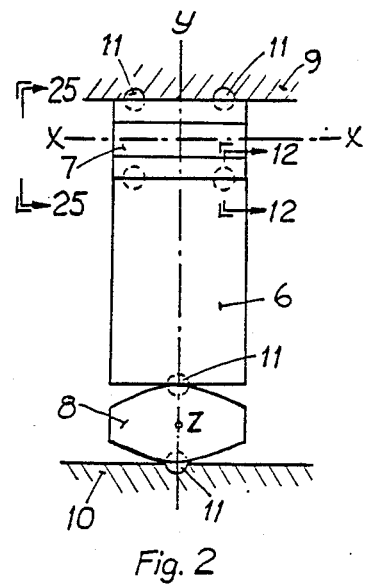
FIG. 2 illustrates a side view of the embodiment shown in FIG. 1.
Figure 3:
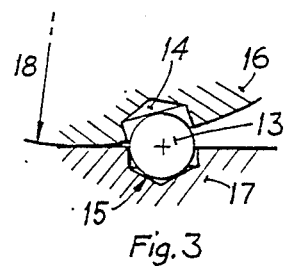
FIG. 3 illustrates a guiding mechanism which can be incorporated in various embodiments of the present invention.
Figure 4:
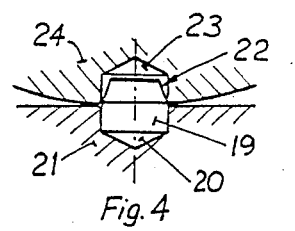
FIG. 4 illustrates an alternative embodiment of the guiding mechanism shown in FIG. 3.

FIG. 2 illustrates a view of the device in the direction of the Z-axis as indicated in FIG. 1. Measuring body 6 is shown having a position between oscillating pieces 7 and 8; that position is also between the underside 9 of the load carrier and the support 10. Guiding means in the form of balls placed in fitting recesses in the contract planes are inserted at the end planes of the measuring body. FIGS. 3 and 4 illustrate embodiments of the guiding means along section 12—12 of FIG. 2; FIG. 3 shows an embodiment in which a ball 13 is placed in circular recesses 14 and 15 in respective bodies 16 and 17; body 16 is an oscillating piece in a turned position and having the radius 18. FIG. 4 shows an embodiment in which a partly conical, circular pin 19 is pressed down into a hole 20 in the symmetry plane of measuring body 21. The upper part of pin 19 has a conical form with the cone angle 22 being adapted such that the opening of hole 23 in the oscillating piece 24 can be moved freely along the side of pin 19 when the oscillating piece is subjected to a turning force.

Figure 5:
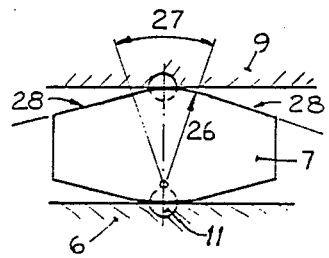
FIG. 5 illustrates a side view of a different embodiment of the transmitting units of FIG. 2.
Figure 6:
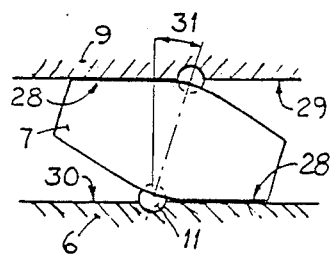
FIG. 6 illustrates the transmitting unit of FIG. 5 at its maximum angle of oscillation.

In FIG. 5, an oscillating piece of FIG. 2 is shown along the direction 25—25. Because uncontrolled great turnings might arise on the oscillating piece 7 at extraordinarily great lateral force (Px, Pz), the circular part with radius 26 can be limited to a desired maximum oscillating angle 27; in that case, the other parts of the cylindrical contact surface can consist of two planes 28 in the directions of the tangents calculated from the maximum angle. Oscillation will be restricted at a position according to FIG. 6; that condition arises when the body 7 abuts the contact surface 29 and 30 along the plane parts 28; at that position, the body 7 will be inclined at the angle value 31.

Figure 7:
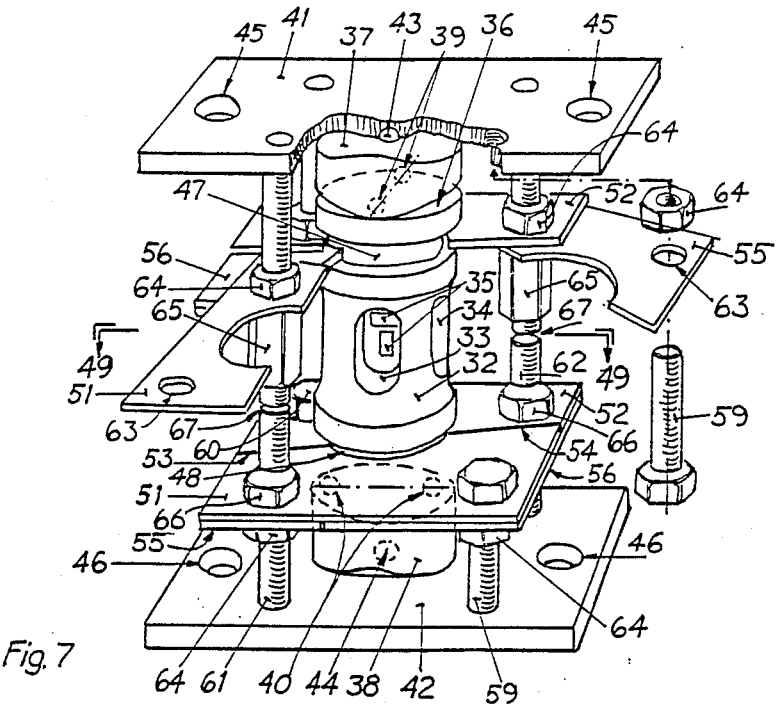
FIG. 7 illustrates a further embodiment of the present invention.
Figures 8, 9, 10:
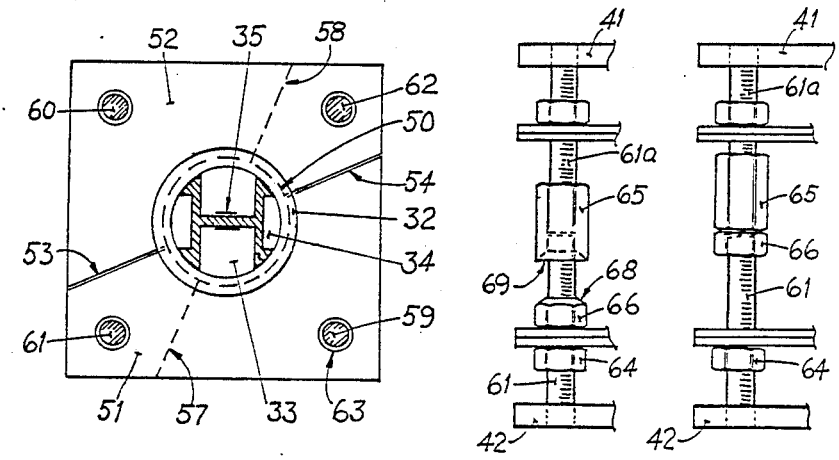
FIG. 8 illustrates a bottom view of a cross-section of the measuring mechanism of FIG. 7, together with an embodiment of the washers shown in FIG. 7.
FIG. 9 illustrates a diagonally placed screw of FIG. 7 and a nut arrangement according to one embodiment of the present invention.
FIG. 10 illustrates diagonally placed screw of FIG. 7 and a nut arrangement according to another embodiment of the present invention.

FIG. 7 shows a complete force transmitting device according to one embodiment of the invention. The measuring body 32 is formed here as a substantially circular cylinder. In its central part the measuring body has recesses 33 and 34 formed similarly at opposing sides; each recess has a depth so selected that the cross-section of the measuring body has the form of a H as is illustrated in FIG. 8. Strain gauges 35 are placed on the central portion of the bottoms of the deepest recesses 33; one such gauge is shown in FIG. 8. With the gauges being connected in a bridge, a measure of the load is obtained in a known manner. Because the location of strain gauges 35 is close to the center of the measuring body, the disturbing influence of bending movements from horizontal forces will be minimized. As shown in FIG. 7, oscillating pieces 37 and 38 are placed above and below the end plane surfaces 36 of the measuring body.

The oscillating pieces are formed as shown in FIG. 5 and are guided by a pair of recessed balls 39 on the upper side of the measuring body and a pair of balls 40 (partly shown) which are arranged in a direction turned 90° relative to the direction of arrangement of balls 39 on the upper side. The oscillating piece 37 is supported against foundation plate 41 on the upper side, and the oscillating piece 38 is supported against foundation plate 42 on the underside. For guiding the positions of the oscillating pieces against the plates, there are also recessed balls 43, and a ball 44 (partly shown). Foundation plate 41 has holes 45 for placing mounting screws of a load carrier (not shown) having a plane underside, and foundation plate 42 can be fastened via holes 46 thereon by means of mounting screws to a support (not shown).

To hold the device together and to provide the possibility of taking up occasional tractive loads, there is provided a divisible washer at each end of the load measuring body. During normal function of the device, the washers are fixed to the foundation plates. The washers enclose the recess 47 at the upper end of the measuring body 32 and also the recesses 48 which are partly shown in FIG. 7 at the lower end of the measuring body. The construction of the washers is apparent from FIG. 8 which shows a section of the device along the line 49—49 of FIG. 7. Each washer has a square form, and consists of two divided plates which jointly form a hole 50 adapted to recess 48. Hole 50 has a diameter greater than the bottom diameter of the recess 48 and is adapted to permit a horizontal movement of the measuring body of a desired maximum size. The total thickness of the plates is adapted to the width of the recess 48 such that a certain angular change of the plates may arise without the plates contacting the sides of the recess.

With reference to FIGS. 7 and 8, an embodiment of the washers will be specifically described. Each washer consists partly of the members 51 and 52 with the graduation line 53—54, and partly of two identical plates 55 and 56 placed below members 51 and 52, with the graduation line 57—58. The plates are held together by means of crews 59, 60 and 61, 62 through holes 63. By an optimum placement of the graduation lines 53—54 and 57—58, the plates can be turned aside for mounting and removing the load measuring body. It is apparent from FIG. 7 how the washer members are fixed by means of nuts 64 on the sides abutting against the foundation plates 41, 42, and by means of nuts 65, 66 on the other side of the washers. Screws 59—62 are threaded into the foundation plates. Each diagonally placed screw (61, 62) is completely threaded without heads, and has separate lengths which extend toward the central section of the device; the separate lengths being adapted to achieve a distance 67 therebetween.

In FIG. 7, plates 51 and 55 of the upper washer are outwardly turned as one of the screws 59 has been removed and the nuts 65 loosened on the screws 61 and 62. If the lower pair of plates 51 and 56 are turned in a corresponding ways towards each's respective side, the measuring body and the oscillating pieces can be taken out of the device. The screws 61, 62 each has separate lengths so adapted to provide the distance 67. That distance is kept at a minimum and is decided by the extent of permitted angular changes from the horizontal plane of the foundation plates. Displacements in the horizontal plane between adjacent screw ends will indicate how well the device is aligned. Two other objects of the screw lengths appear from FIGS. 9 and 10.

FIG. 9 shows one of the screws 61 which is placed diagonally. Its upper length is designated by 61a. The nut 65 on screw 61a has been turned to a position at which it has entered the thread of the bottom length of screw 61, consequently locking the position of the foundation plates relative to one another. If the other diagonally placed nut 65 is turned in the same position, the whole load measuring device is arrested in a correct starting position relative to the starting positions of the foundation plates.

FIG. 10 shows the same details as in FIG. 9 with certain variations. The nut 66 of which the upper side 68 is conical (see FIG. 9) is turned upwards to the upper end of screw 61, and the nut 65 having an internal conicity 69 (see FIG. 9) is turned towards the nut 66. By holding the nut 66 in place and turning the nut 65 further downwards, the foundation plates 41 and 42 will be moved apart from each other. If a raising distance is needed which exceeds the play between the thickness of the washers and the width of the recesses 47 and 48, the screws 59 and 60 can be loosened. Thus, the nuts 65, 66 can be used for withdrawing the foundation plates from one another, if the load measuring body and the oscillating pieces are to mounted or removed without requiring a lift jack. Of course, lift jack is a suitable complement if removal must be carried out when a load carrier has a substantially great measuring load.

No encapsulation details have been shown in FIG. 7. Preferably, an elastic sleave can be placed around oscillating pieces 37 and 38 which provides a seal between the underside of the foundation plate 41 and a side of washers 51, 52 and 55, 56, and also between the upper side of plate 42 and a corresponding side of washers 51, 52, and 55, 56. No encapsulation is shown around the central part of the measuring body. The encapsulation is assumed to be in accordance with the current design of the measuring body which depends on the measurement principle used.

Besides that illustrated in the embodiments shown in FIGS. 7-10, the foundation and fixing plates may have another form. For example, they may be circular instead of rectangular. The number of and the construction of the mounting screws of the fixing plates can also be embodied in another way within the scope of this invention. The invention contemplates designs of the measuring body in very different ways. It need not be massive but can also be made of a plurality of assembled parts, of which the central one, for example, can be a plate laminate fitting a measuring transducer using an inductive principle. The central part of the measuring body can also be made with bending springs on which the strain gauges are placed, or formed such that a surface area of the measuring body with shearing stresses has strain gauges placed thereon in a suitable way.

I claim:

1. An apparatus for measurement of forces, comprising:
   measuring means for measuring a load, having two substantially parallel end planes;
   first and second transmitting unit for transmitting forces corresponding to said load into said measuring means; said first transmitting unit contacting one said end plane of said measuring means and said second transmitting unit contacting the other end plane of said measuring means;

each said first and second transmitting unit having a longitudinal axis parallel to said end planes and perpendicular to each other;

each said first and second transmitting unit also including two curved surface portions one on either side of a plane parallel to said end planes;

all points on each said curved surface portion being the same distance R away from an axis parallel to the longitudinal axis of a corresponding transmitting unit; said distance R being greater than half the height of each transmitting unit in a direction perpendicular to its longitudinal axis.

2. An apparatus as recited in claim 1, further comprising:

first guiding means for preventing transversal movement of one said transmitting unit relative to the measuring means, in any direction parallel to said end planes, and for preventing rotational movement of said transmitting unit around a longitudinal axis of the measuring means which is perpendicular to the longitudinal axis of each said transmitting unit;

second guiding means for preventing transversal movement of the other of said transmitting unit relative to the measuring means, in any direction parallel to said end planes, and for preventing rotational movement of said other transmitting unit around a longitudinal axis of the measuring means which is perpendicular to the longitudinal axis of each said transmitting unit.

3. An apparatus as recited in claim 2, wherein each said first and second guiding means comprises:

a plurality of holes on the surface of a corresponding said end plane, a plurality of holes on one said curved surface portion of a corresponding said transmitting unit, and a pin in each corresponding pair of holes, one hole of each said pair of holes being on said surface of said end plane and the other hole of each said pair of holes being on said curved surface portion.

4. An apparatus as recited in claim 2, wherein each said first and second guiding means comprises:

a plurality of holes on the surface of a corresponding said end plane, a plurality of holes on one said curved surface portion of a corresponding said transmitting unit, and a ball in each corresponding pair of holes, one hole of each said pair of holes being on said surface of said end plane and the other hole of each said pair of holes being on said curved surface portion; both holes of each said pair of holes having a depth provided such that a half portion of a corresponding said ball can be fitted therein.

5. An apparatus as recited in claim 2, wherein each said transmitting unit further including:

first and second plane surface portions one on either side of each said curved surface portion of the same transmitting unit and extending at a tangential direction therefrom, whereby each said curved surface portion corresponds to a maximum oscillation angle of the transmitting unit.

6. An apparatus as recited in claim 1, further comprising:

first foundation plate contacting one said transmitting unit in a force transmitting position;

second foundation plate contacting the other of said transmitting unit in a force transmitting position;

first holding means for connecting said first foundation plate with said measuring means;

second holding means for connecting said second foundation plate with said measuring means.

7. An apparatus as recited in claim 6, further comprising:

first guiding means for preventing transversal movement of one said transmitting unit relative to a foundation plate in contact therewith, in any direction parallel to said end planes, and for preventing rotational movement of said transmitting unit around a longitudinal axis of the measuring means which is perpendicular to the longitudinal axis of each said transmitting unit;

second guiding means for preventing transversal movement of the other of said transmitting unit relative to a foundation plate in contact therewith, in any direction parallel to said end transmitting unit around a longitudinal axis of the measuring means which is perpendicular to the longitudinal axis of each said transmitting unit.

8. An apparatus as recited in claim 7, wherein each said first and second guiding means comprises:

a plurality of holes on the surface of a corresponding said foundation plate, a plurality of holes on one said curved surface portion of a corresponding said transmitting unit, and a pin in each corresponding pair of holes, one hole of each said pair of holes being on said surface of said foundation plate and the other hole of each said pair of holes being on said curved surface portion.

9. An apparatus as recited in claim 7, wherein each said first and second guiding means comprises:

a plurality of holes on the surface of a corresponding said end plane, a plurality of holes on one said curved surface portion of a corresponding said transmitting unit, and a ball in each corresponding pair of holes, one hole of each pair of said holes being on said surface of said end plane and the other hole of each said pair of holes being on said curved surface portion; both holes in each pair of said holes having a depth provided such that a half portion of a corresponding said ball can be fitted therein.

10. An apparatus as recited in claim 7, further comprising:

third guiding means for preventing transversal movement of one said transmitting unit relative to the measuring means, in any direction parallel to said end planes, and for preventing rotational movement of said transmitting unit around a longitudinal axis of each said transmitting unit;

fourth guiding means for preventing transversal movement of the other of said transmitting unit relative to the measuring means, in any direction parallel to said end planes, and for preventing rotational movement of said other transmitting unit around a longitudinal axis of the measuring means which is perpendicular to the logitudinal axis of each said transmitting unit.

11. An apparatus as recited in claim 10, wherein each said holding means comprising:

a split washer having a central hole for engaging a corresponding recessed body portion of said measuring means;

means for attaching said split washer to a corresponding said foundation plate, whereby when the washer is swung into a split position, said measuring means and said transmitting units can be removed.

12. An apparatus as recited in claim 11, whrein said attaching means comprising:
 first and second divided screws, diagonally placed from each other relative to said foundation plates, each having divided portion extending from a different one of said first and second foundation plates toward each other, whereby the distance between said divided portions of each said first and second divided screws is indicative of the angular position of said first and second foundation plates relative to said parallel planes of the measuring means.

13. An apparatus as recited in claim 12, wherein said attaching means further comprising:
 a nut on each said first and second screws operative for placement in a position covering said distance between divided portions of the corresponding screw, thus connecting said divided portions for arresting said apparatus in an initial starting position.

14. An apparatus as recited in claim 12, further comprising:
 means for further separating said foundation plates from each other by increasing the distance between said divided portions of each said divided screw, whereby said transmitting units and said measuring means can be removed.

15. An apparatus as recited in claim 14, wherein said separating means comprises, on each said first and second divided screw:
 a first nut having an outer conical end;
 a second nut having an inner conical end;
 one of said nuts being positioned on one divided portion of a corresponding said screw and the other of said nuts being positioned on the other divided portion of said screw; said first and second nuts also being turned towards each other.

16. An apparatus as recited in claim 7, wherein each said transmitting unit further including:
 first and second plane surface portions one on either side of each said curved surface portion of the same transmitting unit and extending at a tangential direction therefrom, whereby each said curved surface portion corresponds to a maximum oscillation angle of the transmitting unit.

17. An apparatus as recited in claim 6, wherein each said transmitting unit further including:
 first and second plane surface portions one on either side of each said curved surface portion of the same transmitting unit and extending at a tangential direction therefrom, whereby each said curved surface portion corresponds to a maximum oscillation angle of the transmitting unit.

18. An apparatus as recited in claim 1, wherein each said transmitting unit further including:
 first and second plane surface portions one on either side of each said curved surface portion of the same transmitting unit and extending at a tangential direction therefrom, whereby each said curved surface portion corresponds to a maximum oscillation angle of the transmitting unit.

* * * * *